July 6, 1948.  R. C. SANDERS, JR  2,444,678
RADIO BOMB RELEASE SYSTEM
Filed March 2, 1944   3 Sheets-Sheet 1

INVENTOR.
ROYDEN C. SANDERS JR.
BY
ATTORNEY

July 6, 1948.  R. C. SANDERS, JR  2,444,678
RADIO BOMB RELEASE SYSTEM
Filed March 2, 1944  3 Sheets-Sheet 2

INVENTOR.
ROYDEN C. SANDERS JR.
BY
ATTORNEY

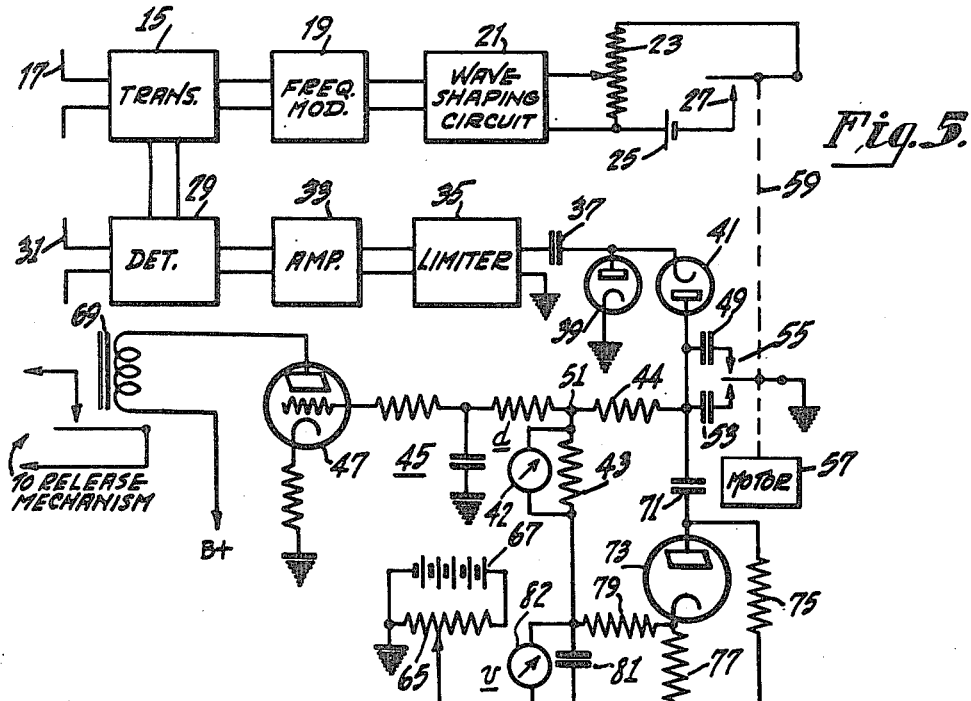
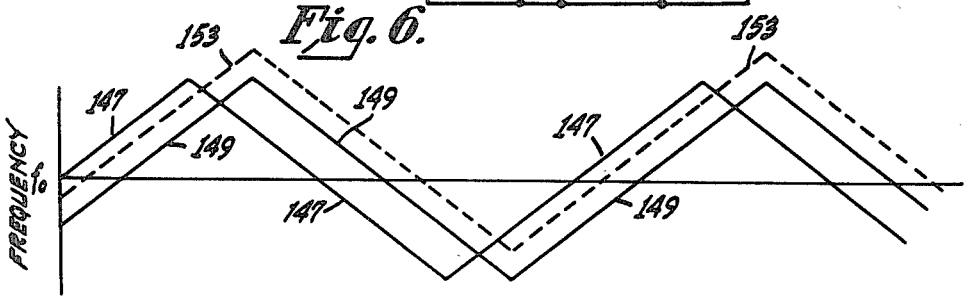
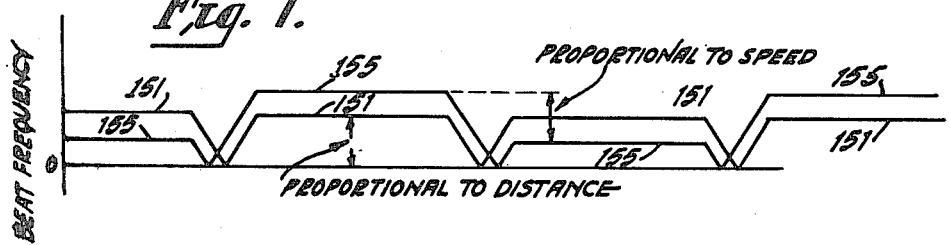

Patented July 6, 1948

2,444,678

UNITED STATES PATENT OFFICE 2,444,678

RADIO BOMB RELEASE SYSTEM

Royden C. Sanders, Jr., Hightstown, N. J., assignor to Radio Corporation of America, a corporation of Delaware Application March 2, 1944, Serial No. 524,796

4 Claims. (Cl. 343—7)

This invention relates to bomb release apparatus, and more particularly to improvements in systems of the type described in copending U. S. application Serial Number 524,795, entitled Radio bomb release system and filed by R. C. Sanders, Jr., on the same date as this application.

The principal object of this invention is to provide a method of and means for energizing a bomb release mechanism in response to radio reflection distance and speed measuring means.

Another object of the invention is to provide a method of and means for electrically computing the measured distance at which the missile is to be released in order to hit its target.

A further object is to provide an improved method of and means for measuring the speed of an aircraft relative to an object on the surface.

Figure 1:
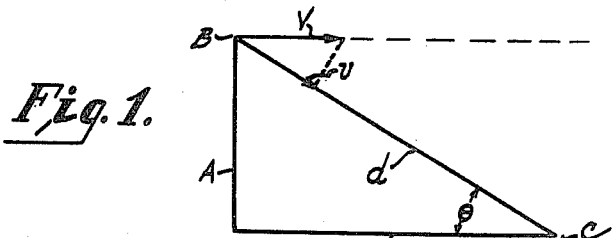
Figure 2:
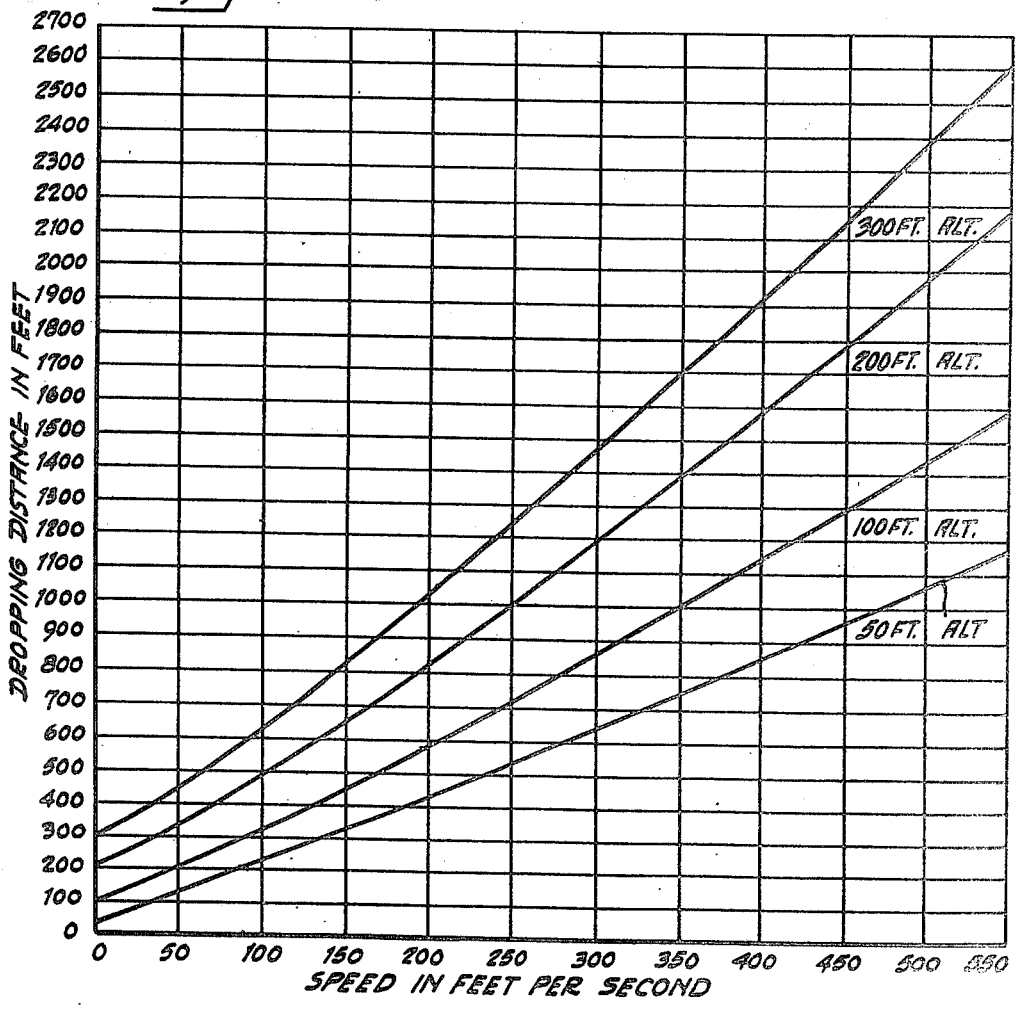
Figure 3:
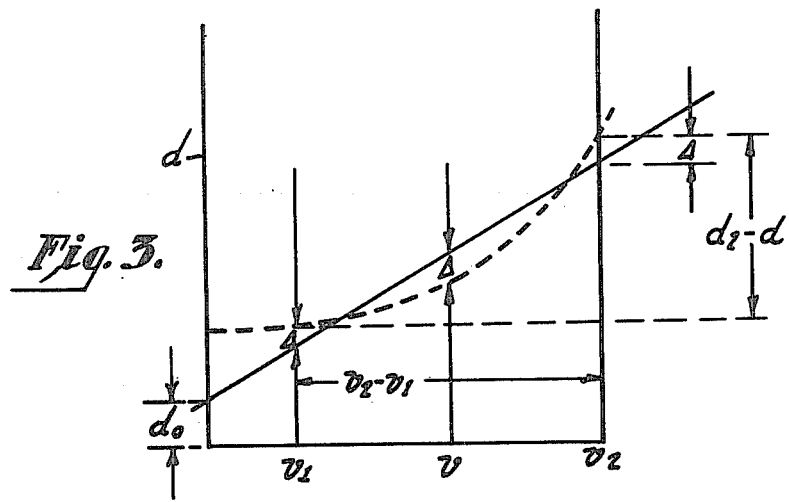
Figure 4:
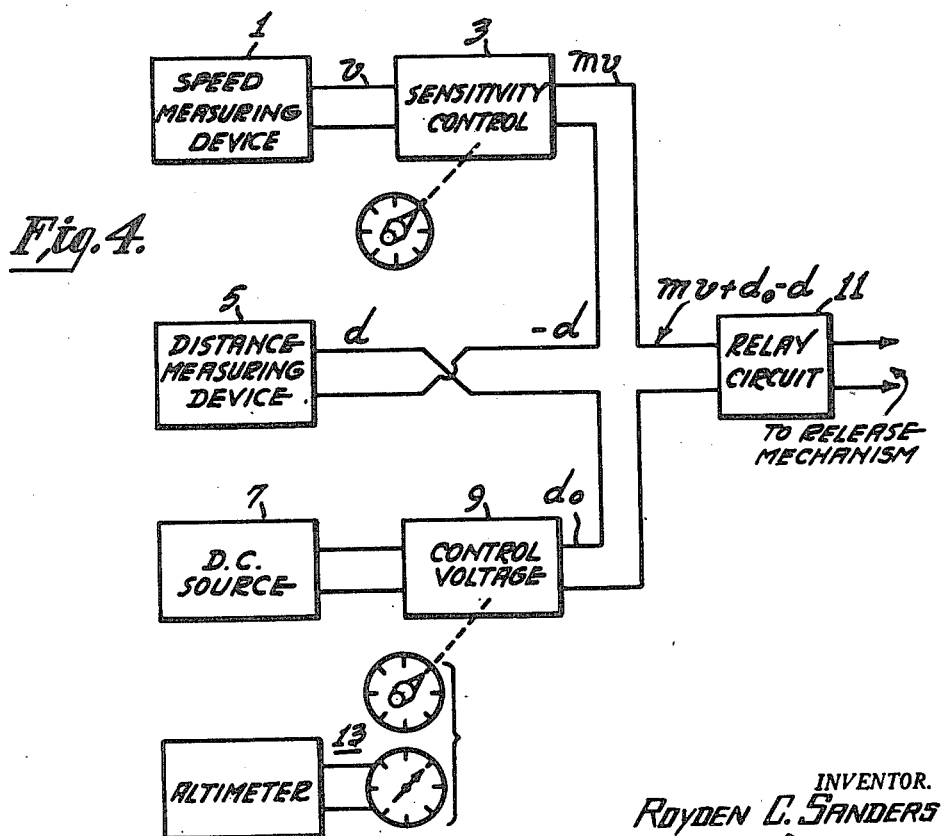

These and other objects will become apparent to those skilled in the art upon consideration of the following description, with reference to the accompanying drawing, of which Figure 1 is a schematic diagram illustrating a bomb release problem, Figure 2 is a group of graphs illustrating relationships between speed, distance, and altitude in the solution of the problem of Figure 1, Figure 3 illustrates the determination of the linear approximation to one of the curves of Figure 2, Figure 4 is a schematic block diagram of a system for performing the required functions of speed and distance measuring and computation of release distance for a given altitude, Figure 5 is a schematic block diagram of a modification of Figure 4, Figure 6 is a group of graphs illustrating the variations in frequency of energy radiated and received by the system of Figure 5, and Figure 7 is a group of graphs illustrating beat frequencies produced in the operation of the system of Figure 5.

Referring to Figure 1, a bomb is to be released from an airplane at the point B, flying at an altitude A, at the proper point to strike a target at the point C. Assuming free fall of the bomb, $$A = \tfrac{1}{2} g t^2$$

where A is the altitude, $g = 32.2$ feet per second per second, and $t$ is the time of fall.

$$t = \sqrt{\tfrac{2A}{32.2}} = \tfrac{\sqrt{A}}{4.01} \text{ seconds}$$

The horizontal distance D from the target at which the bomb must be released is thus $$D = V \tfrac{\sqrt{A}}{4.01}$$

where V is the horizontal component of the speed of the airplane with respect to the target. In other words, for any specific altitude there is a particular relationship between V and D which must exist at the instant the bomb is released.

By means of radio reflection equipment, such as an altimeter of the F-M type, the altitude A may be measured continuously. Similarly, the slant distance $d$ (Figure 1) to the target may be measured. The slant velocity $v$ can also be determined continuously by this type of equipment, as described hereinafter. Since the equipment measures the slant distance and the slant speed relative to the target rather than the horizontal distance and horizontal speed, it is necessary to determine the point of release in terms of these quantities.

The horizontal distance to the target is given by $$D = Vt \qquad (1)$$

but $$D = d \cos \theta \qquad (2)$$

and $$V = \tfrac{v}{\cos \theta} \qquad (3)$$

Substituting in Equation 1

$$d \cos \theta = \tfrac{v}{\cos \theta} t \qquad (4)$$

$$\therefore d = \tfrac{vt}{\cos^2 \theta} \qquad (5)$$

where

D = horizontal distance
V = horizontal speed
A = altitude
$t$ = time of fall
$v$ = slant speed relative to target
$d$ = slant distance to target In order to get the result in terms of slant distance and slant speed rather than angle $$A^2 + D^2 = d^2$$

$$\cos \theta = \tfrac{D}{d} \text{ and } \cos^2 \theta = \tfrac{D^2}{d^2}$$

$$D^2 = d^2 - A^2$$

and $$\therefore \cos^2 \theta = \tfrac{d^2 - A^2}{d^2}$$

Substituting in Equation 5

$$d = \tfrac{vtd^2}{d^2 - A^2}$$

$$d^3 - dA^2 = vtd^2$$

and $$d^2 - vtd - A^2 = 0 \qquad (6)$$

a quadratic equation, the solution of which is $$d = \tfrac{vt}{2} + \sqrt{\left(\tfrac{vt}{2}\right)^2 + A^2} \qquad (7)$$

where $$t = \tfrac{\sqrt{A}}{4.01}$$

Since the equipment will require a certain finite time T to operate and release the bomb after the relationship of Equation 7 is established, the dropping distance $d$ must be increased accordingly, by adding to the time of fall $t$ the delay time $T$:

$$d=\frac{v}{2}\left(\frac{\sqrt{A}}{4.01}+T\right)+\sqrt{\left(\frac{v}{2}\frac{\sqrt{A}}{4.01}+T\right)^2+A^2} \quad (8)$$

In practice, the delay time $T$ may be of the order of 0.4 sec. The value must be determined for the particular equipment used.

A series of curves of slant speed vs. slant dropping distance, for different altitudes may be plotted from Equation 8. Figure 2 shows a typical group of such curves. The curves do not pass through zero because they are based on slant speed and slant distance. When the airplane is directly above the target, the distance to the target is the altitude, rather than zero.

In the system of the present invention, a straight line approximation to the curves of Figure 2 is used, rather than the actual non-linear relation between speed and distance. Figure 3 shows one of the curves of Figure 2, plotted (dash line) on a different scale so as to accentuate the nonlinearity. To obtain the best approximation to the curve, a range of speeds most likely to be used is selected. The lower and upper limits of this range are designated $v_1$ and $v_2$, respectively, in Figure 3. The corresponding dropping distances, determined from Equation 8, are $d_1$ and $d_2$. The solid line, representing the linear approximation, is drawn with a slope $$m=\frac{d_2-d_1}{v_2-v_1}$$

and in a position such that its maximum deviation $\Delta$ from the dash curve is a minimum over the selected speed range.

The equation of the linear approximation is $$d=mv+d_0 \quad (9)$$

where $d_0$ is the distance intercept, indicated in Figure 3. The constants $m$ and $d_0$ are different for each altitude.

Refer to Figure 4. A speed measuring device 1, capable of providing a D.-C. output voltage proportional in magnitude to the slant speed $v$, is connected to a sensitivity control 3. The device may be of the radio reflection type, described hereinafter. The sensitivity control may be an attenuator connected in the output circuit of the device 1, or any other means for varying the proportionality constant $m$ between the D.-C. output voltage and the speed $v$.

A distance measuring device 5, arranged to provide D.-C. output proportional in magnitude to the slant distance $d$, has its output circuit connected in series with that of the control 3 in opposing polarity, so that equal changes in the two outputs would produce no change in their sum. The device 5 may also be of the radio reflection type, similar in construction and operation to the F-M altimeter.

A D.-C. source 7 is also connected in series with the outputs of the devices 3 and 5, through a voltage control 9. The algebraic sum of the three output voltages is applied to a relay device 11, which, for the sake of simplicity in explanation, is assumed to operate upon the occurrence of zero voltage at its input circuit, although in fact it may be designed to operate at any predetermined voltage, providing an additional voltage is supplied to it so that operation will occur when the algebraic sum of the outputs of the devices 3, 5 and 9 is zero.

The controls 3 and 9 are adjustable in accordance with the altitude at which a bombing run is to be made, to positions corresponding to the constants $m$ and $d_0$, respectively. An altimeter 13, which may be of the above-mentioned radio reflection type, is provided to enable the pilot to maintain the altitude to which the controls 3 and 9 set. The controls may be ganged to a single manually operable knob, or automatically operated from the altimeter by means of a servo system, not shown.

In the operation of the system, the controls 3 and 9 are set as described above, and the aircraft is flown toward the target. The total voltage applied to the relay circuit 11 is proportional to $mv+d_0-d$. As the target is approached, the component corresponding to $d$ will decrease with decrease in the slant distance. The component corresponding to $mv$ will ordinarily decrease also, although, at a varying rate, because of decrease in the value of cosine $\theta$ (see Figure 1) as the target is approached. When the condition of Equation 9

$$d=mv+d_0$$

is reached, the total voltage applied to the relay circuit 11 is zero, and the bomb is released. Providing the azimuth (horizontal direction of flight) is correct, the bomb will strike the target, within the limit of error of the linear approximation. The magnitude of this error is greatest at the highest altitude. At an altitude of 300 feet the maximum error over the range of 110 ft./sec. to 500 ft./sec. (slant speed) is plus or minus 12 feet.

The functions of speed and distance measuring can be combined in a single unit, requiring but one transmitter and one receiver. Referring to Figure 5, a transmitter 15 is connected to an antenna 17 and to a frequency modulator 19. The frequency modulator 19 may be of the vibratory variable capacitor type described in copending U. S. application Serial No. 471,003, filed January 1, 1943, by Sydney V. Perry and entitled Capacity modulator unit. The input circuit of the modulator 19 is connected through a wave shaping circuit 21 and an adjustable voltage divider 23 to a D.-C. source 25 and a periodically operable switch 27. The wave shaping circuit may be of the type described in copending U. S. application Serial Number 512,153, filed November 29, 1943, by Irving Wolff, and entitled Vibratory mechanical systems, or any known means for causing linear triangular wave operation of the modulator 19 in response to square wave input to the wave shaping circuit 21.

A detector 29, which may be of the type described in copending U. S. application Serial Number 445,720, filed June 4, 1942, which issued May 6, 1947, as Patent No. 2,420,199, by R. C. Sanders, Jr., and entitled Frequency modulated altimeter or distance indicator, or which may be any type of beat frequency detector, is connected to a receiving antenna 31 and coupled to the transmitter 15. The output of the detector 29 is applied through an amplifier 33 to a limiter 35. The output circuit of the limiter 35 is coupled through a capacitor 37 to the anode of a diode 39 and to the cathode of a diode 41. The anode of the diode 41 is connected to a load comprising series resistors 43 and 44. The junction point 51 of resistors 43 and 44 is coupled through a low pass filter 45 to the control grid of an electron discharge tube 47. The anode circuit of the tube 47 includes the actuating coil of a relay 69, which is connected to energize a bomb release mechanism, not shown. The anode of the diode 41 is also connected to a pair of capacitors 49 and 53, which are in turn connected to the stationary contacts of a double throw switch 55. The movable contact of the switch 55 is grounded, and is mechanically coupled to the switch 27 for periodic operation in synchronism therewith by a motor 57, as schematically indicated by the dash line 59.

One terminal of the load resistor 44 is coupled through a capacitor 71 to a rectifier circuit comprising a diode 73, an input resistor 75, and a load resistor 77. The load resistor 77 is coupled through a low pass filter comprising a resistor 79 and a capacitor 81 to the lower end of the resistor 43. The lower ends of resistors 75 and 77 are returned to ground through a bias source comprising an adjustable voltage divider 65 connected across a battery 67.

The operation of the system of Figure 5 is as follows: The motor 57 opens and closes the switch 27 periodically, connecting the source 25 to the voltage divider 23 at regular intervals of, for example, .01 sec. The resulting square wave voltage is attenuated to a predetermined amplitude by the voltage divided 23 and applied to the wave shaping circuit 21, where it is modified in accordance with the mechanical characteristics of the modulator 19 to a wave of such form as to produce linear triangular wave variation of the capacitance presented by the modulator 19 to a tuned circuit of the transmitter 15. The output of the transmitter 15 accordingly varies cyclically in frequency, as illustrated by the line 147 in Figure 6. A portion of the transmitter output radiated by the antenna 17 is reflected by the target to the receiving antenna 31 and applied to the detector 29. The detector 29 produces a beat note output, equal in frequency to the difference in instantaneous frequency between the reflected signal picked up by the antenna 31 and the signal applied directly from the transmitter 15.

Assuming that the distance from the target to the antennas 17 and 31 remains constant, the reflected wave picked up by the antenna 31 will vary cyclically in frequency like the transmitted wave, but the variations will lag those of the transmitted wave by the time required for radiation to travel from the antenna 17 to the target and back to the antenna 31. The variations in frequency of the received wave under this condition is illustrated by the line 149 of Figure 6. The two signals differ in frequency, except near the inflection points of the triangular wave, by a constant amount proportional to the distance of the target, as shown by the line 151 of Figure 7. The frequency of the resulting beat note output of the detector 29 is $$\frac{Sf_m d}{246}$$

cycles per second, where S is the frequency sweep width in megacycles per second per sweep, $f_m$ is the modulating frequency (frequency of operation of the switch 27) in cycles per second, and $d$ is the distance in feet.

If there is relative motion between the target and the antennas, such that the distance $d$ is decreasing, the frequency of the received signal is increased, owing to Doppler effect, by an amount proportional to speed, as shown by the dash line 153 of Figure 6. The beat output of the detector 29 is accordingly decreased during increase of transmitter frequency, and increased during decrease of transmitter frequency, as illustrated by the line 155 of Figure 7. The difference between the upper and lower values of the beat frequency is proportional to the speed. The difference between the beat frequency under this condition and that which would be produced if there were no relative motion is $$\frac{2vf_0}{C}$$

cycles per second, where $v$ is the velocity in feet per second, $f_0$ is the average frequency of the transmitted signal in cycles per second, and C is the velocity of radio waves in feet per second.

The beat frequency output of the detector 29 is amplified by the amplifier 33, limited to a constant amplitude by the limiter 35 and applied through the capacitor 37 to the diodes 39 and 41. During negative half cycles of the output of the limiter 35, i. e., when the anode of the diode 39 and the cathode of the diode 41 are negative with respect to ground, the diode 41 conducts, charging one of the capacitors 49 and 53, depending upon the position of the switch 55, through the capacitor 37. During positive half cycles of the limiter output, the capacitor 37 is discharged through the diode 39. This operation is repeated for each cycle of the limiter output. The charge deposited on the load capacitor (49 or 53) for each cycle is a function of the limiter output amplitude. The rate of charge is thus related to the frequency of the limiter output. The load capacitor is discharged continuously through the load resistor 43 and resistors 79 and 77. Thus the voltage across the load capacitor will build up with successive cycles of limiter output to a value such that the rate of charge equals the rate of discharge, subsequently remaining constant at this value as long as the limiter output frequency does not change.

Since the switch 55 is operated synchronously with the switch 27, one of the load capacitors, for example the capacitor 53, will be operative during the modulation up-sweep, or increase of transmitter frequency, and the other load capacitor 49 will be operative during the modulation down-sweep, or decrease of transmitter frequency. Thus the capacitor 49 will become charged to a voltage higher than that to which the capacitor 53 is charged, the difference between the two voltages being proportional to the Doppler shift and hence to the speed $v$. Both capacitors are charged by the above described action in such polarity that they are positive at the terminals connected to the switch 55 and negative at the terminals connected to the diode 41.

With operation of the switch 55, the voltage at the upper end of the resistor 43 is cyclically changed from one to the other of the values to which the capacitors 49 and 53 are charged. A portion of the D.-C. component of this voltage is conducted through the low pass filter 45 to the control grid of the tube 47. This component has a magnitude proportional to the distance $d$, which may be indicated by a D.-C. meter 42 connected across the resistor 43. The A.-C. component passes through the capacitor 71 and is rectified by the diode 73, providing a voltage across the resistor 77 having an average magnitude proportional to the speed $v$. This voltage is smoothed by the filter 79, 81, and added algebraically to the voltage across the resistor 43. A D.-C. meter 82 is connected across the capacitor 81 to provide a direct indication of the speed $v$. Inasmuch as the voltage produced across the capacitor 81 by rectification in the diode 73 is positive with respect to ground and the voltage produced by rectification in the diode 41 is negative with respect to ground, the average voltage between the upper end of the resistor 43 and the lower end of the capacitor 81 is negative and is proportional to a factor times the speed minus the distance: $(mv - d)$. The value of the factor $m$ depends upon the relative responses of the system to speed and distance. This is in turn determined by the circuit constants, which remain fixed, and by the ratio of the distance sensitivity $$\frac{Sf_m}{246}$$

in cycles per second per foot and speed sensitivity $$\frac{2f_0}{C}$$

in cycles/sec./ft./sec. It is evident that varying the sweep width $S$ will vary the distance sensitivity without effecting the speed sensitivity. Accordingly the factor $m$ may be adjusted to any predetermined value by varying the sweep width with the voltage divider 23.

The voltage between the control grid and the cathode of the tube 47 is the algebraic difference between the voltage between the point 51 and the lower end of the capacitor 81, and the voltage at the adjustable tap of the voltage divider 65. The voltage divider 65 is adjusted in accordance with the altitude to bias the control grid of the tube 47 to a voltage proportional to $d_0$ plus the voltage which would be just sufficient to allow the tube 47 to conduct and operate the relay 69. With the adjustments of the voltage dividers 23 and 65 made as described, the voltage between the control grid and the cathode of the tube 47 is initially relatively large, and negative, preventing conduction. As the target is approached, this voltage becomes decreasingly negative, reaching the value at which the tube will conduct enough to operate the relay 69 at the proper instant of release.

Thus the invention has been described as an automatic bomb release system, employing radio reflection measurements of target distance and speed with respect to the target to actuate a release mechanism upon the occurrence of a predetermined relationship between speed and distance. In the described system, distance measurements are made by means of frequency modulated waves as in an F-M type of altimeter. Speed is measured by the same equipment by measuring the deviation in frequency of the beat between the direct and reflected waves. This variation is caused by Doppler effect and is proportional to the speed. Speed proportional and distance proportional voltages are combined to provide a resultant voltage which reaches a predetermined value when the required conditions for bomb release occur.

I claim as my invention:

1. The method of providing response to a predetermined relationship between speed and distance with respect to a reflecting object, including the steps of transmitting a frequency modulated signal to said object, receiving said signal after reflection, combining said received signal with said transmitted signal to produce a beat signal, deriving from said beat signal a voltage substantially proportional in instantaneous magnitude to the frequency of said beat signal, separating the A.-C. component of said voltage from the D.-C. component thereof, rectifying said A.-C. component, combining said rectified A.-C. component in opposing polarity with said D.-C. component to produce a resultant voltage, and producing a response upon the attainment by said resultant voltage of a predetermined magnitude.

2. A radio bomb release system including means for radiating a frequency modulated signal, means for receiving said signal after reflection by a target, means for combining said radiated and said received signals to produce a beat signal, a frequency responsive circuit coupled to said combining means and including an input capacitor, a pair of unidirectionally conductive devices connected to said input capacitor for conduction in respectively opposite directions, a pair of load capacitors and means for selectively and alternately connecting said load capacitors to one of said unidirectionally conductive devices in synchronism with the increase and decrease in frequency respectively of said transmitted signal, whereby a varying voltage is produced at said unidirectionally conductive device, means for separating the A.-C. and D.-C. components of said varying voltage, means for rectifying said A. C. component, means for combining said rectified A.-C. component in opposition with said D.-C. component to provide a resultant voltage, and relay means responsive to the magnitude of said resultant voltage.

3. A system for providing response to a predetermined relationship between the speed and distance of a mobile craft with respect to a reflecting object, including means for radiating a frequency modulated signal, means for receiving said signal after reflection by said object, detector means for combining said radiated and said received signal to produce a beat frequency signal, frequency responsive means coupled to said detector means and including a counter circuit provided with two load capacitors, means for alternately and selectively connecting said load capacitors to said counter circuit in synchronism respectively with increase in frequency and decrease in frequency of said transmitted signal, whereby said counter circuit produces a cyclically varying output voltage, filter means connected to said counter circuit for separating the A.-C. component from the D.-C. component of said counter output voltage, rectifier means connected to rectify said A.-C. component, means for combining said rectified A.-C. component with said D.-C. component to provide a control voltage, and relay means responsive to the attainment by said control voltage of a predetermined magnitude.

4. A system for measuring the speed of a mobile craft with respect to a reflecting object, including means for radiating a frequency modulated signal, means for receiving said signal after reflection by said object, detector means for combining said radiated and said received signal to produce a beat frequency signal, frequency responsive means coupled to said detector means and including a counter circuit provided with two load capacitors, means for alternately and selectively connecting said load capacitors to said counter circuit in synchronism respectively with increase in frequency and decrease in frequency of said transmitted signal, whereby said counter circuit produces a cyclically varying output voltage, and filter means connected to said counter circuit for separating the A.-C. component from the D.-C. component of said counter output voltage.

ROYDEN C. SANDERS, Jr.

REFERENCES CITED

The following references are of record in the file of this patent:

FOREIGN PATENTS

| Number | Country | Date |
| --- | --- | --- |
| 115,055 | Australia | Apr. 23, 1942 |